United States Patent
Meyer

(10) Patent No.: US 11,231,351 B2
(45) Date of Patent: Jan. 25, 2022

(54) PORTABLE FLEXURE FIXTURES FOR STRESSING GLASS SAMPLES AND METHODS OF TESTING STRESSED GLASS SAMPLES

(71) Applicant: CORNING INCORPORATED, Corning, NY (US)

(72) Inventor: Timothy Edward Meyer, Pine City, NY (US)

(73) Assignee: Corning Incorporated, Corning, NY (US)

( * ) Notice: Subject to any disclaimer, the term of this patent is extended or adjusted under 35 U.S.C. 154(b) by 269 days.

(21) Appl. No.: 16/667,135

(22) Filed: Oct. 29, 2019

(65) Prior Publication Data

US 2020/0132575 A1 Apr. 30, 2020

Related U.S. Application Data

(60) Provisional application No. 62/753,555, filed on Oct. 31, 2018.

(51) Int. Cl.
*G01N 3/08* (2006.01)
*G01N 3/06* (2006.01)

(52) U.S. Cl.
CPC .......... *G01N 3/08* (2013.01); *G01N 3/06* (2013.01); *G01N 2203/0003* (2013.01); *G01N 2203/0017* (2013.01); *G01N 2203/0069* (2013.01); *G01N 2203/0254* (2013.01);
(Continued)

(58) Field of Classification Search
CPC .... G01N 3/06; G01N 3/08; G01N 2203/0254; G01N 2203/0435; G01N 2203/0282; G01N 2203/0278; G01N 2203/0069; G01N 2203/0003; G01N 2203/04; G01N 2203/0017
See application file for complete search history.

(56) References Cited

U.S. PATENT DOCUMENTS

2005/0084679 A1* 4/2005 Sglavo ............... F16K 17/16
428/410
2012/0131960 A1* 5/2012 Harper ............... C03B 23/02
65/60.1

OTHER PUBLICATIONS

Morrell, R. "Biaxial flexural strength testing of ceramic materials", National Physical Laboratory, Dec. 2007.<https://www.semanticscholar.org/paper/Biaxial-flexural-strength-testing-of-ceramic-Morrell/71a8eeed305a0abe201626af0e76960de8a63f80> (Year: 2007).*

(Continued)

*Primary Examiner* — Jonathan M Dunlap

(57) ABSTRACT

A portable flexure fixture including a fixture housing, a translatable plug, a load ring, and a support ring. The fixture housing includes a first end opposite a second end, a plug receiving opening extending into the first end and a test opening extending into the second end. The support ring is disposed in the fixture housing. The translatable plug is insertable into the plug receiving opening of the fixture housing and is translatable in both a sample engaging direction and a sample releasing direction. Further, the load ring is coupled to the translatable plug and is positioned at a sample facing end of the translatable plug such that translation of the translatable plug in the sample engaging direction translates the load ring in the sample engaging direction and translation of the translatable plug in the sample releasing direction translates the load ring in the sample releasing direction.

20 Claims, 6 Drawing Sheets

(52) U.S. Cl.
CPC ........ *G01N 2203/0278* (2013.01); *G01N 2203/0282* (2013.01); *G01N 2203/04* (2013.01); *G01N 2203/0435* (2013.01)

(56) References Cited

OTHER PUBLICATIONS

Zi et al, "Size Effect on Biaxial Flexural Strength of Concrete", ACI Materials Journal, V. 111, No. 1-6, Jan.-Dec. 2014. <http://www.cee.northwestern.edu/people/bazant/PDFs/Papers/535.pdf> (Year: 2014).*

* cited by examiner

PORTABLE FLEXURE FIXTURES FOR STRESSING GLASS SAMPLES AND METHODS OF TESTING STRESSED GLASS SAMPLES

CROSS-REFERENCE TO RELATED APPLICATIONS

This application claims the benefit of priority under 35 U.S.C. § 119 of U.S. Provisional Application Ser. No. 62/753,555 filed on Oct. 31, 2018 the content of which is relied upon and incorporated herein by reference in its entirety.

BACKGROUND

The present disclosure relates to devices for testing the surface strength of glass-based samples and methods of testing the surface strength of glass-based samples using these devices.

SUMMARY

According to aspect (1), a portable flexure fixture is provided. The portable flexure fixture comprises: a fixture housing, a translatable plug, a load ring, and a support ring. The fixture housing comprises a first end opposite a second end, a plug receiving opening extending into the first end and a test opening extending into the second end. The support ring is disposed in the fixture housing. The translatable plug is insertable into the plug receiving opening of the fixture housing and is translatable in both a sample engaging direction and a sample releasing direction. The load ring is coupled to the translatable plug and is positioned at a sample facing end of the translatable plug such that translation of the translatable plug in the sample engaging direction translates the load ring in the sample engaging direction and translation of the translatable plug in the sample releasing direction translates the load ring in the sample releasing direction.

According to aspect (2), the portable flexure fixture of aspect (1) is provided, wherein the support ring comprises an interior hole and the support ring is disposed in the fixture housing such that the interior hole is aligned with the test opening.

According to aspect (3), the portable flexure fixture of aspect (1) or (2) is provided, wherein the plug receiving opening is coaxial with the test opening.

According to aspect (4), the portable flexure fixture of any one of aspects (1) to (3) is provided, wherein the load ring is coaxial with the support ring when the translatable plug is positioned in the plug receiving opening.

According to aspect (5), the portable flexure fixture of aspect (4) is provided, wherein the load ring comprises a sample contacting portion comprising a load ring diameter, the support ring comprises a sample contacting portion comprising a support ring diameter, and the load ring diameter is different than the support ring diameter.

According to aspect (6), the portable flexure fixture of any one of aspects (1) to (5) is provided, wherein: the plug receiving opening comprises a plug receiving surface; the translatable plug comprises an engagement surface; and the plug receiving surface and the engagement surface are threaded such that when the translatable plug is positioned in the plug receiving opening, rotation of the translatable plug translates the translatable plug in the sample engaging direction or in the sample releasing direction.

According to aspect (7), the portable flexure fixture of aspect (6) is provided, wherein the translatable plug is coupled to the load ring in a rotation independent engagement such that rotation of the translatable plug does not rotate the load ring.

According to aspect (8), the portable flexure fixture of any one of aspects (1) to (7) is provided, further comprising a conical seat disposed in the fixture housing, wherein: the fixture housing comprises a conical surface; the conical seat is disposed on the conical surface of the fixture housing; and the support ring is disposed on the conical seat.

According to aspect (9), the portable flexure fixture of aspect (8) is provided, wherein: the conical seat comprises a ring facing surface and a seat portion recessed into the ring facing surface; and the support ring is disposed in the seat portion of the ring facing surface of the conical seat.

According to aspect (10), the portable flexure fixture of aspect (9) is provided, wherein the plug receiving opening comprises a plug receiving surface extending from the first end of the fixture housing to an interior shoulder and the interior shoulder extends from the plug receiving surface to the conical surface.

According to aspect (11), the portable flexure fixture of any one of aspects (1) to (10) is provided, wherein the fixture housing further comprises an interior shoulder and the support ring is disposed on the interior shoulder.

According to aspect (12), the portable flexure fixture of any one of aspects (1) to (11) is provided, wherein the fixture housing comprises an access hole extending from an outer surface of the fixture housing to an inner surface of the fixture housing.

According to aspect (13), the portable flexure fixture of aspect (12) is provided, wherein: the access hole comprises a window region, a first slot portion extending from the window region in a first direction and a second slot portion extending from the window region in a second direction; the first slot portion comprises a first slot height, the second slot portion comprises a second slot height, and the window region comprises a window region height; and the window region height is greater than the first slot height and the second slot height.

According to aspect (14), a method of measuring a surface strength of a glass-based sample is provided. The method comprises: positioning the glass-based sample in contact with a support ring disposed in a fixture housing of a portable flexure fixture, wherein the fixture housing comprises a first end opposite a second end, a plug receiving opening extending into the first end, and a test opening extending into the second end; translating a translatable plug disposed in the plug receiving opening in a sample engaging direction such that a load ring coupled to the translatable plug and positioned at a sample facing end of the translatable plug contacts the glass-based sample and the load ring and the support ring collectively apply a biaxial force to the glass-based sample, placing the glass-based sample under tensile stress; and measuring the surface strength of the glass-based sample while the glass-based sample is under tensile stress using a measuring device.

According to aspect (15), the method of aspect (14) is provided, wherein the support ring comprises an interior hole and is disposed in the fixture housing such that the interior hole is aligned with the test opening.

According to aspect (16), the method of aspect (15) is provided, further comprising contacting the glass-based sample with testing media when the glass-based sample is under tensile stress, wherein contacting the glass-based sample with the testing media comprises directing the testing media through the test opening and the interior hole of the support ring and into contact with the glass-based sample.

According to aspect (17), the method of aspect (15) is provided, wherein measuring the surface strength of the glass-based sample while the glass-based sample is under tensile stress comprises directing the measuring device through the test opening and the interior hole of the support ring.

According to aspect (18), the method of aspect (15) is provided, wherein the load ring is coaxial with the support ring when the load ring and the support ring contact the glass-based sample.

According to aspect (19), the method of aspect (15) is provided, wherein positioning the glass-based sample in contact with the support ring comprises inserting the glass-based sample into the fixture housing through an access hole, the access hole extending from an outer surface of the fixture housing to an inner surface of the fixture housing.

According to aspect (20), the method of aspect (15) is provided, wherein: the plug receiving opening comprises a plug receiving surface, the translatable plug comprises an engagement surface having plug threads and both the plug receiving surface and the engagement surface are threaded; translating the translatable plug in the sample engaging direction comprises rotating the translatable plug; and the translatable plug is coupled to the load ring in a rotation independent engagement such that rotation of the translatable plug does not rotate the load ring.

Although the concepts of the present disclosure are described herein with primary reference to devices for testing the surface strength of glass, it is contemplated that the concepts will enjoy applicability to testing a variety of properties of glass.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
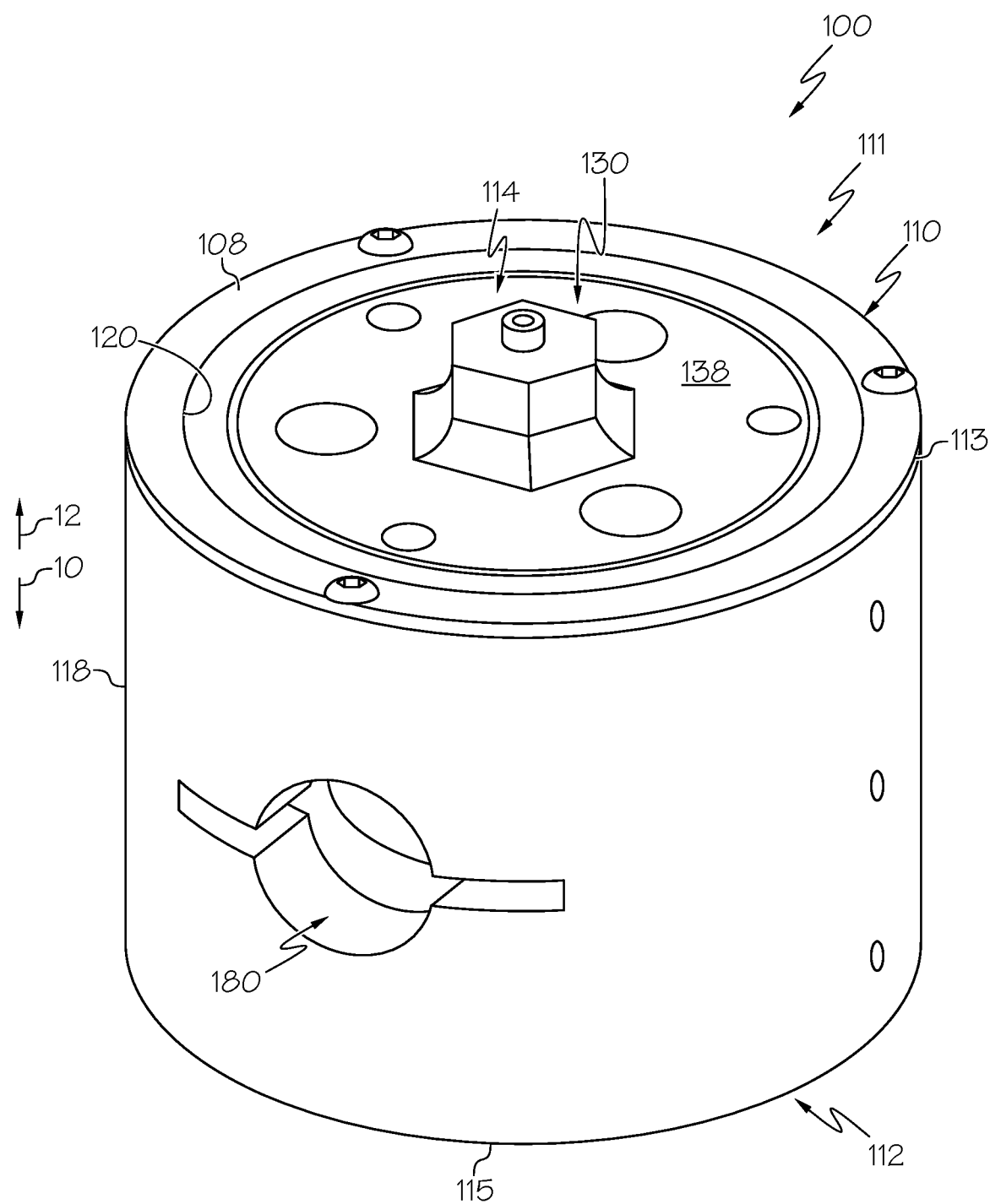
FIG. 1 is an isometric view of a portable flexure fixture comprising a fixture housing and a translatable plug, according to one or more embodiments shown and described herein.

Surface strength is a measurement used to characterize glass-based samples. Surface strength is typically measured via a ring-on-ring (ROR) testing method, which tests the biaxial flexure strength of the glass and is characterized by the ASTM C1499-09 protocol. In the ROR testing method, strain gauges and/or digital image correlation may be used to determine surface strength of the glass-based sample. During digital image correlation, two cameras image the portion of the surface placed under tensile stress (i.e., flexed) to calculate the strain in the glass-based sample. However, strain gauges reduce surface strength when attached to a surface of a glass-based sample and the support ring of traditional ROR fixtures obstruct the flexed portion of the glass-based sample, preventing the cameras from observing and measuring the glass-based sample surface to facilitate digital image correlation. Additionally, traditional ROR fixtures do not facilitate easy introduction of damage to the glass-based sample surface while it is under stress (e.g., under a static stress), limiting a user's ability to introduce controlled damage to the glass-based sample while the glass-based sample is stressed, thereby limiting a user's ability to replicate typical failure mechanisms that occur in cover glass articles in component level testing, which impedes development of glass-based articles for consumer device applications. Accordingly, improved devices for testing the surface strength of glass-based samples are desired.

The present disclosure is a portable flexure fixture with a fixture housing that provides a user with access to a glass-based sample while the portable flexure fixture stresses (e.g., flexes) the glass-based sample. In particular, the user can view the glass-based sample while the glass-based sample is under stress, for example, through one or more access holes in the fixture housing, the user can measure a surface of the glass-based sample that is under stress, for example, by directing a measuring device though both a test opening in the fixture housing and a support ring having an interior hole, and the user can introduce additional stresses and damage to the surface of the glass-based sample that is under stress, for example, by directing testing media through both the testing hole of the fixture housing and the interior hole of the support ring and thereafter contacting the surface of the glass-based sample. Thus, the portable flexure fixture described herein provides a portable glass-based sample testing device that allows a user to manipulate and measure a glass-based sample while the glass-based sample is under stress. Reference is now made in detail to various embodiments of the disclosure, examples of which are illustrated in the accompanying drawings. Whenever possible, the same or like reference numbers and symbols are used throughout the drawings to refer to the same or like parts.

As utilized herein, the term "glass-based" refers to any object wholly or partly formed from glass. For example, a "glass-based sample" may include a glass, a glass ceramic (including an amorphous glass phase and a crystalline phase), a laminate of a glass and a crystalline material, or a laminate of a glass and a non-crystalline material.

Figure 2:
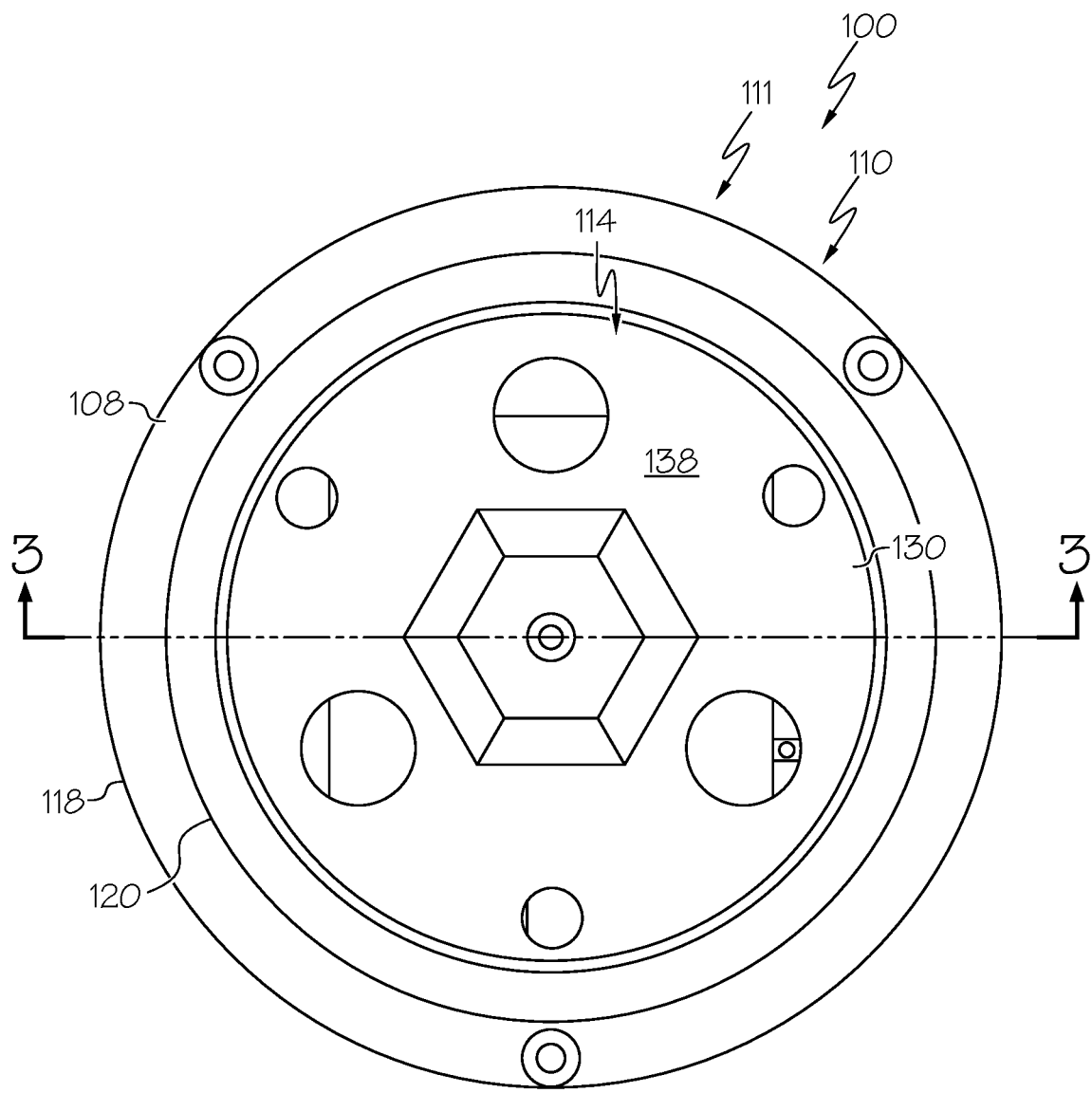
FIG. 2 is a top view of the portable flexure fixture of FIG. 1, according to one or more embodiments shown and described herein.
Figure 3:
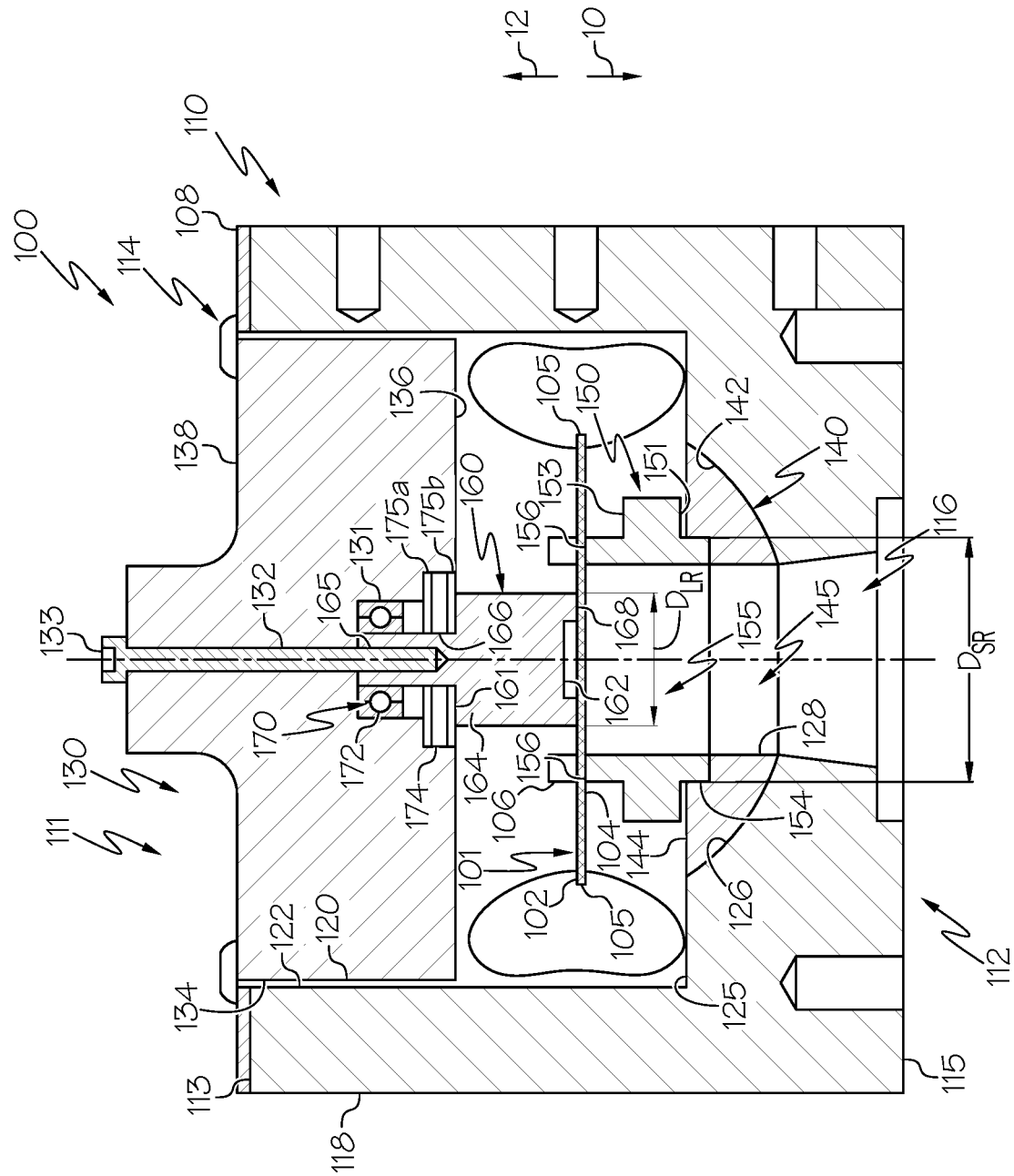
FIG. 3 is a cross-sectional view of the portable flexure fixture of FIG. 1, along line 3-3 of FIG. 2, according to one or more embodiments shown and described herein.
Figure 4A:
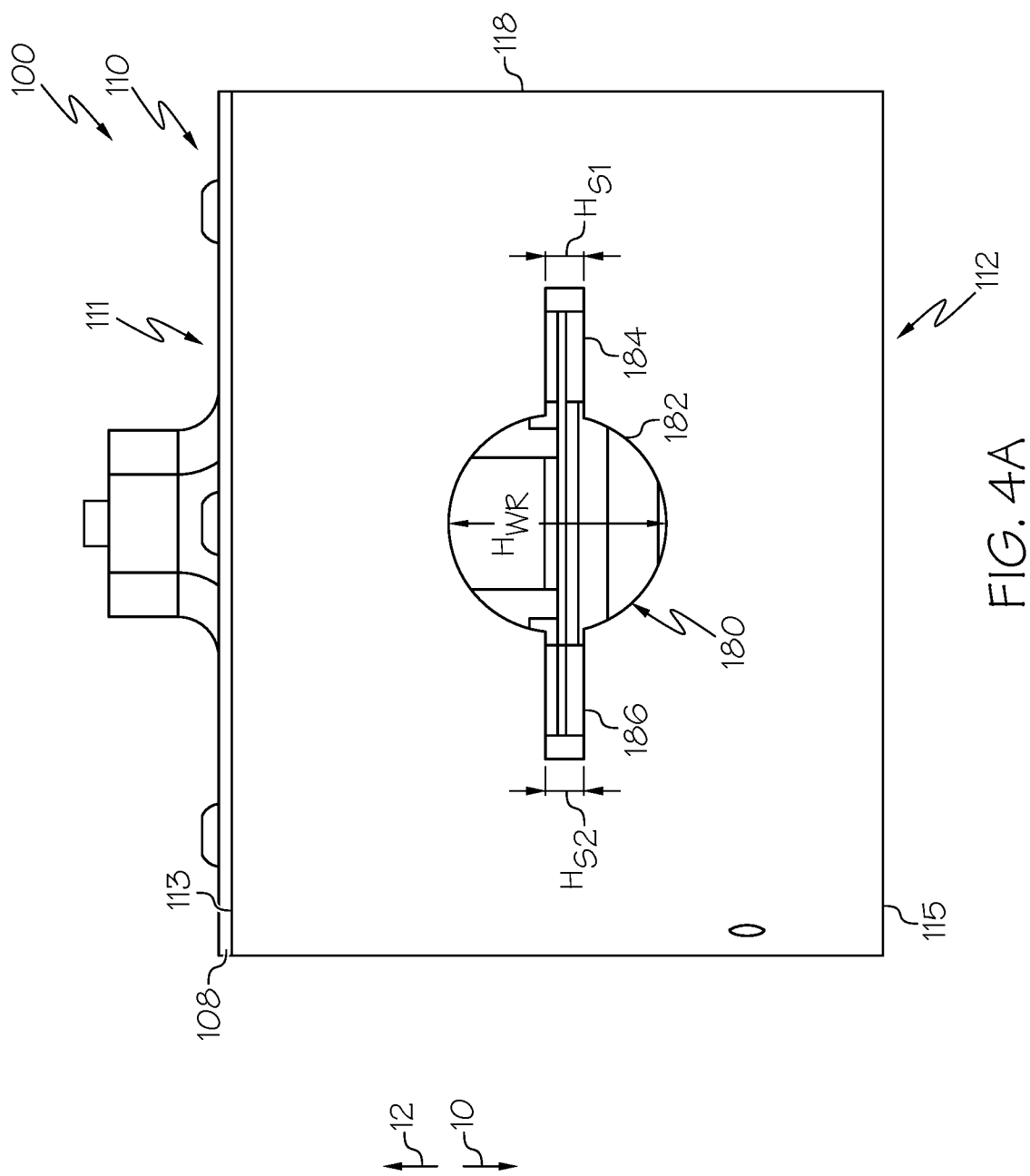
FIG. 4A is a side view of the portable flexure fixture of FIG. 1, according to one or more embodiments shown and described herein.
Figure 4B:
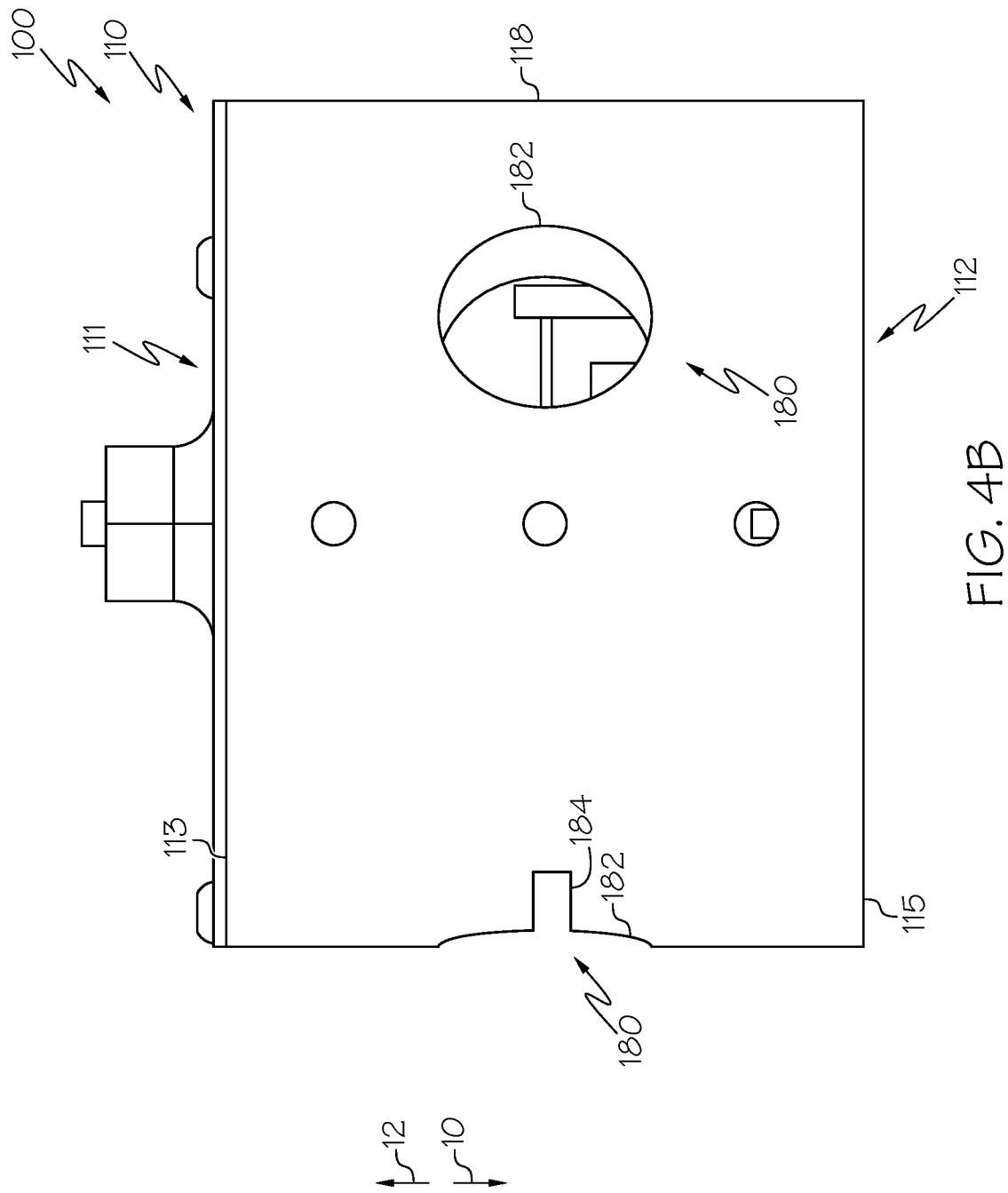
FIG. 4B is another side view of the portable flexure fixture of FIG. 1, according to one or more embodiments shown and described herein.

Referring to FIGS. 1-4B, a portable flexure fixture 100 is depicted in an isometric view (FIG. 1), a top view (FIG. 2), a cross-sectional view (FIG. 3) and two side views (FIGS. 4A and 4B). The portable flexure fixture 100 comprises a fixture housing 110 having a first end 111 opposite a second end 112, an outer surface 118, and an inner surface 120. The fixture housing 110 also includes an upper surface 113 extending between the outer surface 118 and the inner surface 120 at the first end 111 and a lower surface 115 (FIG. 3) extending between the outer surface 118 and the inner surface 120 at the second end 112. Further, the fixture housing 110 has a plug receiving opening 114 extending into the first end 111 and a test opening 116 extending into the second end 112. In some embodiments, the plug receiving opening 114 is coaxial with the test opening 116. As depicted in FIGS. 1-4B, the portable flexure fixture 100 further comprises a translatable plug 130, which is insertable into the plug receiving opening 114 of the fixture housing 110. In operation, the translatable plug 130 provides a translatable mechanism to facilitate selective application of force to a glass-based sample 101 (FIG. 3) disposed in the fixture housing 110 such that one or more properties (e.g., surface strength) of the glass-based sample 101 may be measured.

Referring now to FIG. 3, which is a cross sectional view taken along line 3-3 of FIG. 2, the interior of the portable flexure fixture 100 and the glass-based sample 101 are depicted. The glass-based sample 101 comprises a first surface 102 opposite a second surface 104 and one or more edge surfaces 105 extending from the first surface 102 to the second surface 104. The glass-based sample 101 comprises a width of from about 10 mm to about 100 mm, such as from about 25 mm to about 75 mm or from about 40 mm to about 60 mm, for example, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, or about 95 mm, and any and all sub-ranges formed from any of these endpoints. The glass-based sample 101 comprises a length of from about 10 mm to about 100 mm, such as from about 25 mm to about 75 mm, or from about 40 mm to about 60 mm, for example, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, or about 95 mm, and any and all sub-ranges formed from any of these endpoints. Further, the glass-based sample 101 may have a thickness (e.g., a depth) of from about 50 microns ($\mu m$) to about 10 mm, such as from about 100 m to about 5 mm, from about 0.5 mm to about 3 mm, and any and all sub-ranges formed from any of these endpoints.

The glass-based sample 101 may comprise any glass composition, such as borosilicate glass, soda-lime glass, aluminosilicate glass, alkali aluminosilicate, alkaline earth aluminosilicate glass, alkaline earth boro-aluminosilicate glass, or the like. In some embodiments, the glass-based sample 101 may be strengthened, for example, via thermal tempering or ion-exchange. Without intending to be limited by theory, strengthened glass-based samples comprise a layer of compressive stress that extends from one or more surfaces of the glass-based sample 101 (e.g., one or both of the first surface 102 and the second surface 104) to a certain depth within the glass-based sample 101, referred to as the depth of compression. The compressive stresses are balanced by a layer of tensile stresses (referred to as central tension) such that the net stress in the glass-based sample 101 (without the applied stress of the portable flexure fixture 100) is zero. The formation of compressive stresses at the surfaces 102, 104 of the glass-based sample 101 makes the glass-based sample 101 strong and resistant to mechanical damage and, as such, increases the surface strength of the glass-based sample 101. As described herein, this surface strength may be measured using the portable flexure fixture 100.

Moreover, without intending to be limited by theory, in an ion exchange process, ions in a surface layer of the glass-based sample 101 are replaced by larger ions having the same valence or oxidation state, for example, by partially or fully submerging the glass-based sample 101 in an ion exchange bath. Replacing smaller ions with larger ions causes a layer of compressive stress to extend from one or more surfaces of the glass-based sample 101 (e.g., one or both of the first surface 102 and the second surface 104), which is balanced by a region of tensile stress between the layers of compressive stress.

Referring still to FIG. 3, the inner surface 120 of the fixture housing 110 includes multiple portions, in particular, a plug receiving surface 122, an interior shoulder 125, a conical surface 126, and a test opening surface 128. The plug receiving surface 122 extends from the plug receiving opening 114 toward the second end 112 of the fixture housing 110 and terminates at the interior shoulder 125. As depicted in FIG. 3, the plug receiving surface 122 is engageable with the translatable plug 130, which is insertable into the plug receiving opening 114 of the fixture housing 110. The translatable plug 130 comprises an engagement surface 134 that faces and contacts the plug receiving surface 122 when the translatable plug 130 is disposed in the fixture housing 110. Further, the translatable plug 130 comprises a sample facing end 136 and an outward facing end 138, opposite the sample facing end 136. In operation, the translatable plug 130 is translatable in both a sample engaging direction 10 and a sample releasing direction 12. As shown in FIG. 3, the sample engaging direction 10 is the direction from the first end 111 of the fixture housing 110 toward the second end 112 of the fixture housing 110 and the sample releasing direction 12 is the direction from the second end 112 of the fixture housing 110 toward the first end 111 of the fixture housing 110.

In some embodiments, the plug receiving surface 122 of the fixture housing 110 and the engagement surface 134 of the translatable plug 130 are threaded such that the plug receiving surface 122 and the engagement surface are threadably engageable to facilitate selective translation of the translatable plug 130. For example, the translatable plug 130 may be rotated in one rotation direction (e.g., clockwise or counterclockwise) to translate the translatable plug 130 in the sample engaging direction 10 and rotated in the opposite rotation direction (e.g., clockwise or counterclockwise) to translate the translatable plug 130 in the sample releasing direction 12. Further, each revolution of the translatable plug 130 may translate the translatable plug 130 in either the sample engaging direction 10 (e.g., downward displacement) or the sample releasing direction 12 (i.e., upward displacement) a distance of from about 0.25 millimeters (mm) to about 0.75 mm, such as about 0.5 mm to about 0.7 mm, for example, about 0.3 mm, about 0.35 mm, about 0.4 mm, about 0.45 mm, about 0.5 mm, about 0.55 mm, about 0.6 mm, about 0.635 mm, about 0.65 mm, or about 0.7 mm, and any and all sub-ranges formed from any of these endpoints. In operation, the translatable plug 130 may be manual (e.g., actuated by the user) or automatic (e.g., motorized or otherwise mechanically actuated).

In operation, threadable engagement between the plug receiving surface 122 of the fixture housing 110 and the engagement surface 134 of the translatable plug 130 allows the user to both alter and set the position of the translatable plug 130 in the fixture housing 110. Further, the portable flexure fixture 100 may comprise one or more indicators 108, such as dial indicators, digital indicators, or the like, configured to measure both the rotational position and the translational position of the translatable plug 130 in the plug receiving opening 114 of the fixture housing 110. In the embodiments depicted herein, the one or more indicators 108 comprise a dial plate indicator coupled to the upper surface 113 of the fixture housing 110; however, it should be understood that any indicator is contemplated. The one or more indicators 108 allow the user to precisely determine the position of the translatable plug 130 with respect to the glass-based sample 101, allowing the user to determine the translation position that a load ring 160 contacts the glass-based sample 101. In addition, the one or more indicators 108 may be configured to measure the force (e.g., biaxial force) applied to the glass-based sample by the load ring 160 and a support ring 150. Moreover, while the translatable plug 130 is threadably engageable with the fixture housing 110 in the embodiments depicted in FIGS. 1-4B, it should be understood that any engagement method that allows the translatable plug 130 to be selectively altered and set in the plug receiving opening 114 of the fixture housing 110.

Referring still to FIG. 3, the portable flexure fixture 100 further comprises the load ring 160, which is engaged with the translatable plug 130. The load ring 160 comprises an upper end 161, a lower end 162, and a bulk portion 164 between the upper end 161 and the lower end 162. The load ring 160 also comprises a sample contacting portion 168 extending from the bulk portion 164 to the lower end 162 of the load ring 160. The sample contacting portion 168 is in a ring shape and comprises a load ring diameter $D_{LR}$. In operation, the sample contacting portion 168 may contact the glass-based sample 101, for example, when the glass-based sample 101 is positioned on the support ring 150.

The load ring 160 further comprises a coupling protrusion 166 extending from the bulk portion 164 to the upper end 161 of the load ring 160, and a blind bore 165, which may be threaded, extending into the coupling protrusion 166. The translatable plug 130 comprises a plug seat 131 extending into the sample facing end 136 and a through bore 132 extending through the translatable plug 130, for example, from the outward facing end 138 to the plug seat 131. The through bore 132 comprises a smaller diameter than the plug seat 131 and in some embodiments the through bore 132 is coaxial with the plug seat 131. In addition, the through bore 132 is aligned with the blind bore 165 of the load ring 160 when the load ring 160 is coupled to the translatable plug 130. A plug fastener 133 may be positioned in the through bore 132 and may be used to couple the translatable plug 130 and the load ring 160. In particular, the plug fastener 133 may extend into the through bore 132 at the outward facing end 138 of the translatable plug 130 and into the blind bore 165 of the load ring 160. For example, the plug fastener 133 may comprise threads and may threadably engage with the blind bore 165 to couple the translatable plug 130 to the load ring 160.

In some embodiments, the load ring 160 is coupled to translatable plug 130 in a rotation independent engagement such that rotation of the translatable plug 130 does not rotate the load ring 160. For example, the portable flexure fixture 100 may comprise one or more bearings 170 (e.g., a ball bearing 172 and a thrust bearing 174) disposed between the load ring 160 and the translatable plug 130. In particular, the one or more bearings 170 may be disposed between the coupling protrusion 166 of the load ring 160 and the plug seat 131 of the translatable plug 130. In operation, the bearings 170 facilitate free rotation of the translatable plug 130 around the load ring 160 without inducing movement of the load ring 160. In addition, one or more washers may be disposed in contact with the one or more bearings 170. For example, in the embodiment depicted in FIG. 3, a first washer 175a is disposed between the ball bearing 172 and the thrust bearing 174 and a second washer 175b is disposed between the thrust bearing 174 and the bulk portion 164 of the load ring 160. While bearings 170 are used to facilitate rotation independent engagement of the load ring 160 and the translatable plug 130, it should be understood that any configuration that facilitates rotation independent engagement may be used.

Referring still to FIG. 3, the support ring 150 is disposed in the fixture housing 110. The glass-based sample 101 may be positioned on the support ring 150, which provides a support surface for the glass-based sample 101. In operation, translation of the translatable plug 130, and thereby translation of the load ring 160, may place both the support ring 150 and the load ring 160 in contact with the glass-based sample 101 and allows a user to apply selective force to the glass-based sample 101. Because the load ring 160 is engaged with the translatable plug 130, translation of the translatable plug 130 in the sample engaging direction 10 also translates the load ring 160 in the sample engaging direction 10 and translation of the translatable plug 130 in the sample releasing direction 12 also translates the load ring 160 in the sample releasing direction 12.

In the embodiment depicted in FIG. 3, the second surface 104 is in contact with support ring 150, for example the second surface 104 of the glass-based sample 101 may rest on the support ring 150 while the load ring 160 is translated into contact with the first surface 102 of the glass-based sample 101 (contact which is also depicted in FIG. 3). In operation, once both the load ring 160 and the support ring 150 contact the glass-based sample 101, the support ring 150 and the load ring 160 may apply force, for example, biaxial force, to the glass-based sample 101. The biaxial force applied to the glass-based sample 101 by the load ring 160 and the support ring 150 place tensile stress on the glass-based sample 101. Furthermore, because the translatable plug 130 is engaged with the load ring 160, the translatable plug 130 may fix the load ring 160 in engagement with the glass-based sample 101 thereby fixing the glass-based sample 101 under tensile stress, allowing a user to test the glass-based sample 101 while the glass-based sample 101 is under tensile stress.

Referring still to FIG. 3, the support ring 150 comprises a ring body 152, an engagement footer 154, a sample contacting portion 156, and an interior hole 155. The ring body 152 of the load ring 160 comprises a lower body surface 151 and an upper body surface 153. The engagement footer 154 extends from the lower body surface 151 and the sample contacting portion 156 extends from the upper body surface 153. In addition, the support ring 150 is disposed in the fixture housing 110 such that the interior hole 155 is aligned with the test opening 116 of the fixture housing 110. Further, when the translatable plug 130 is positioned in the plug receiving opening 114, the support ring 150, in particular, the interior hole 155 of the support ring 150, is coaxial with the load ring 160. The sample contacting portion 156 provides the surface that contacts the glass-based sample 101 (e.g., the second surface 104 of the glass-based sample 101), when the glass-based sample 101 is disposed in the fixture housing 110.

Moreover, the sample contacting portion 156 comprises a support ring diameter $D_{SR}$. As depicted in FIG. 3, the support ring diameter $D_{SR}$ of the sample contacting portion 156 of the support ring 150 is different than the load ring diameter $D_{LR}$ of the sample contacting portion 168 of the load ring 160. Because the support ring diameter $D_{SR}$ is different than the load ring diameter $D_{LR}$, there is a radial offset between the location at which the sample contacting portion 168 of the load ring 160 contacts the first surface 102 of the glass-based sample 101 and the location that the sample contacting portion 156 of the support ring 150 contacts the second surface 104 of the glass-based sample 101, such that the collective force applied by the load ring 160 and the support ring 150 to the glass-based sample 101, flexes the glass-based sample 101 and applies biaxial stress to the glass-based sample 101. In some embodiments, the support ring diameter $D_{SR}$ may comprise from about 0.5 inches (in) to about 1.55 in, for example, about 0.6 in, about 0.7 in, about 0.8 in, about 0.9 in, about 1.0 in, about 1.1 in, about 1.2 in, about 1.3 in, or about 1.4 in, and any and all sub-ranges formed from any of these endpoints. Further, the load ring diameter $D_{LR}$ may comprise from about 0.25 in to about 0.75 in, for example, about 0.3 in, about 0.35 in, about 0.4 in, about 0.45 in, about 0.5 in, about 0.55 in, about 0.6 in, about 0.65 in, about 0.7 in, and any and all sub-ranges formed from any of these endpoints. In some embodiments, the support ring diameter $D_{SR}$ is larger than the load ring diameter $D_{LR}$ and in other embodiments, the support ring diameter $D_{SR}$ is smaller than the load ring diameter $D_{LR}$. In embodiments in which the support ring diameter $D_{SR}$ is larger than the load ring diameter $D_{LR}$, the support ring diameter $D_{SR}$ may be about 1.5 to about 3 times the load ring diameter $D_{LR}$, for example, about 1.75 times the load ring diameter $D_{LR}$, about 2 times the load ring diameter $D_{LR}$, about 2.25 times the load ring diameter $D_{LR}$, about 2.5 times the load ring diameter $D_{LR}$, about 2.75 times the load ring diameter $D_{LR}$, and any and all sub-ranges formed from any of these endpoints.

Referring still to FIG. 3, the interior shoulder 125 of the inner surface 120 of the fixture housing 110 extends inward from the plug receiving surface 122 and, in some embodiments, is substantially orthogonal to the plug receiving surface 122. In some embodiments, the interior shoulder 125 extends from the plug receiving surface 122 to a conical surface 126. The conical surface 126 is a conical or otherwise tapered region of the inner surface 120 of the fixture housing 110 that extends from the interior shoulder 125 both inwardly and in a direction toward the second end 112 of the fixture housing 110. The conical surface 126 terminates inwardly at a test opening surface 128, which forms the interior surface of the test opening 116 and extends from the conical surface 126 to the second end 112 of the fixture housing 110. Moreover, while FIG. 3 depicts both the interior shoulder 125 and the conical surface 126, it should be understood that, in other embodiments, such as the embodiment depicted in FIG. 5, the inner surface 120 of the fixture housing 110 may comprise the interior shoulder 125 but not the conical surface 126. Furthermore, in yet other embodiments, the fixture housing 110 may comprise the conical surface 126 and not the interior shoulder 125.

Referring still to FIG. 3, the portable flexure fixture 100 further comprises a conical seat 140 disposed in the fixture housing 110. The conical seat 140 comprises a housing engaging surface 142, a ring facing surface 144 and an interior hole 145. When the conical seat 140 is disposed in the fixture housing 110, the housing engaging surface 142 contacts the conical surface 126. Further, in the embodiment depicted in FIG. 3, the shape of the conical surface 126 of the fixture housing 110 complements the shape of the conical seat 140 such that when the housing engaging surface 142 of the conical seat 140 is engaged with the conical surface 126, the interior shoulder 125 of the fixture housing 110 is aligned with the ring facing surface 144 of the conical seat 140. The ring facing surface 144 of the conical seat 140 further comprises a seat portion recessed into the ring facing surface 144 the conical seat 140, for example, at the edge of the conical seat 140 facing the interior hole 145 of the conical seat 140. Further, the seat portion is sized and configured to receive the support ring 150 and the recessed nature of the seat portion provides stability to the support ring 150 such that the support ring 150 does not slide along the conical seat 140, for example, when testing a glass-based sample 101.

Referring still to FIG. 3, the portable flexure fixture 100 comprises one or more dowel pins 106, which may be disposed in the fixture housing 110. The one or more dowel pins 106 may be coupled to the interior shoulder 125 or the conical seat 140 and disposed such that the dowel pins 106 may be disposed close to or in contact with the edge surfaces 105 of the glass-based sample 101 when the glass-based sample 101 is disposed on the support ring 150. In operation, the dowel pins 106 help laterally position the glass-based sample 101 and prevent unintended lateral movement of the glass-based sample 101 when the support ring 150 and the load ring 160 apply force to the glass-based sample 101.

Referring now to FIGS. 4A and 4B, the fixture housing 110 further comprises one or more access holes 180 extending through the fixture housing 110 from the outer surface 118 to the inner surface 120 (FIGS. 1-3). The one or more access holes 180 may comprise a window region 182, a first slot portion 184 extending from the window region 182 in a first direction, and a second slot portion 186 extending from the window region 182 in a second direction, opposite the first direction. However, as depicted in FIG. 4B, some of the one or more access holes 180 may comprise the window region 182 without the first slot portion 184 or the second slot portion 186. The window region 182 comprises a window region height $H_{WR}$, which, in embodiments in which the window region 182 is circular, is also a diameter of the window region 182. Further, the first slot portion 184 comprises a first slot height $H_{S1}$ and the second slot portion 186 comprises a second slot height $H_{S2}$. In some embodiments, the first slot height $H_{S1}$ and the second slot height $H_{S2}$ are smaller than the window region height $H_{WR}$. In some embodiments, the first slot height $H_{S1}$ and the second slot height $H_{S2}$ are equal.

In operation, at least one of the one or more access holes 180 (i.e., an access hole 180 comprising both the first slot portion 184 and the second slot portion 186) allows a user to insert the glass-based sample 101 into the fixture housing 110 and onto the support ring 150. In particular, the first slot portion 184 and the second slot portion 186 are sized and configured to receive the glass-based sample 101. For example, the first slot height $H_{S1}$ and the second slot height $H_{S2}$ may each be larger than the thickness of the glass-based sample 101 and both the first slot portion 184 and the second slot portion 186 may terminate at locations apart from one another at a distance greater than the width of the glass-based sample 101, the length of the glass-based sample 101, or both. In operation, the one or more access holes 180 provide viewing windows to allow a user to observe the glass-based sample 101 when the portable flexure fixture 100 is testing the glass-based sample 101. For example, to facilitate observation of the glass-based sample 101, the window region height $H_{WR}$ may be larger than the first the first slot height $H_{S1}$ and the second slot height $H_{S2}$.

Figure 5:
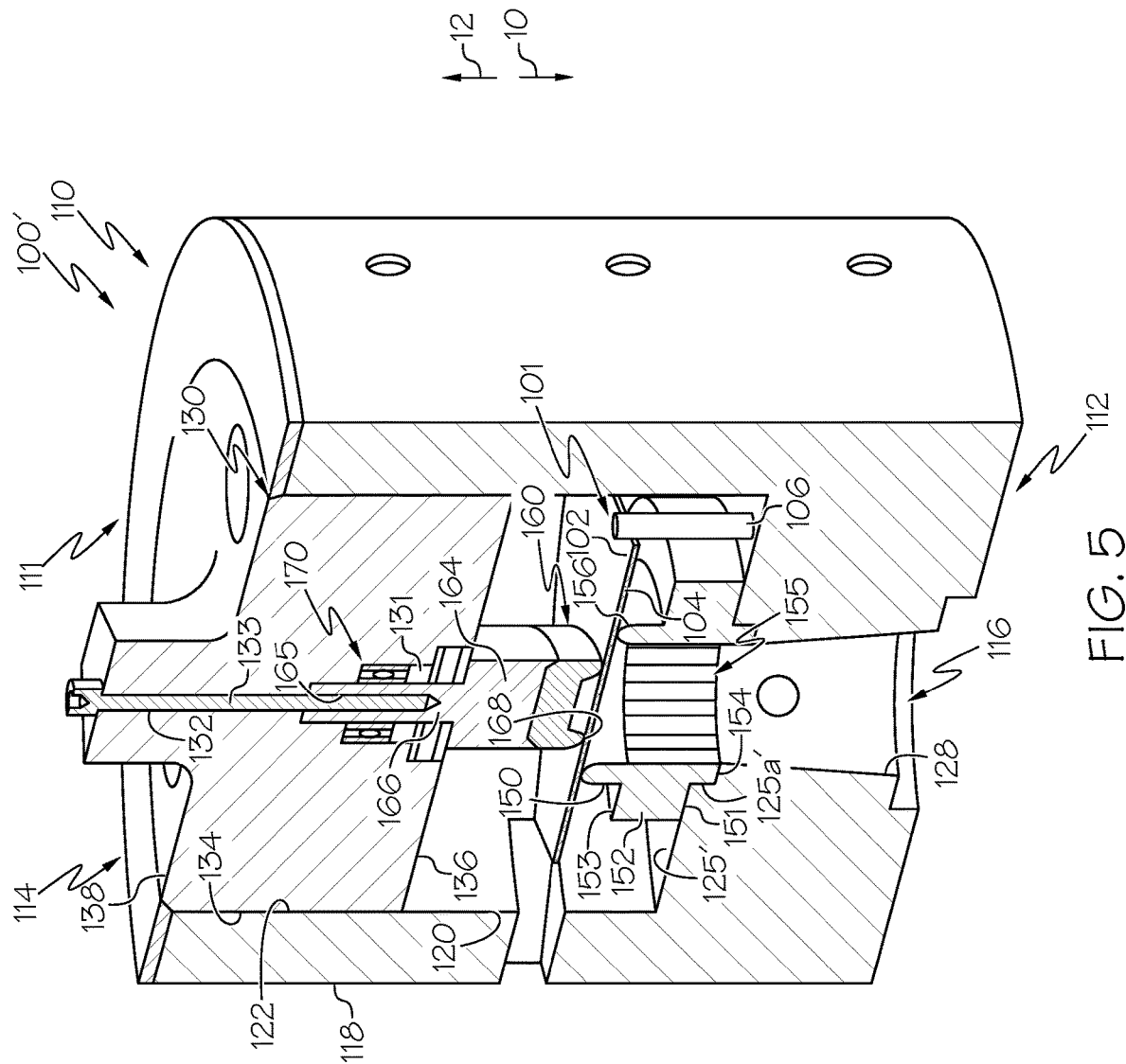
FIG. 5 is a partial isometric view of another embodiment of a portable flexure fixture, according to one or more embodiments described herein.

Referring now to FIG. 5, a partial view of a portable flexure fixture 100' is depicted. The portable flexure fixture 100' is a similar to the portable flexure fixture 100 described above and thus, for ease of understanding, the discussion of the portable flexure fixture 100' will focus on the differences between the portable flexure fixture 100' and the portable flexure fixture 100. In particular, the fixture housing 110 of the portable flexure fixture 100' comprises an interior shoulder 125' and does not include the conical surface 126. The interior shoulder 125 extends from the plug receiving surface 122 to the test opening surface 128, for example, in a direction substantially orthogonal to the plug receiving surface 122. Further, the portable flexure fixture 100' does not include the conical seat 140 and instead, the interior shoulder 125' includes a seat portion 125a' recessed into the interior shoulder 125', for example, at the edge of the interior shoulder 125' facing the test opening 116 of the fixture housing 110. The seat portion 125a' of the interior shoulder 125' is sized and configured to receive the support ring 150 and the recessed nature of the seat portion 125a' provides stability to the support ring 150 such that the support ring 150 does not slide along the interior shoulder 125', for example, when testing the glass-based sample 101. Moreover, while not depicted, yet other embodiments are contemplated that comprise the conical surface 126 and not the interior shoulder 125. In these embodiments, the conical surface 126 extends from the plug receiving surface 122 to the test opening surface 128, for example, both inwardly and in a direction toward the second end 112 of the fixture housing 110.

Referring again to FIGS. 1-5, the portable flexure fixture 100, 100' may be used to test the glass-based sample 101, for example to test the surface strength of the glass-based sample 101. A method of testing the glass-based sample 101 first comprises positioning the glass-based sample 101 in contact with the support ring 150. In some embodiments, positioning the glass-based sample 101 in contact with the support ring 150 comprises inserting the glass-based sample 101 into the fixture housing 110 through the access hole 180. Next, the method comprises positioning the translatable plug in the plug receiving opening 114 of the fixture housing 110 and translating the translatable plug 130 in the sample engaging direction 10 such that a load ring 160 contacts the glass-based sample 101, for example, the first surface 102 of the glass-based sample 101, such that both the load ring 160 and the support ring 150 contact and apply a biaxial force to the glass-based sample 101, thus placing the glass-based sample 101 under tensile stress. Continued translation of the translatable plug 130 in the sample engaging direction 10 while the load ring 160 and the support ring 150 contact the glass-based sample 101 increases the biaxial force applied to the glass-based sample 101 and may flex the glass-based sample 101. Further, the user may stop translating the translatable plug 130 in the sample engaging direction 10 while the load ring 160 and the support ring 150 both contact the glass-based sample 101 to fix the glass-based sample 101 under a particular amount of tensile stress.

Referring still to FIGS. 1-5, the method may also comprise measuring the surface strength of the glass-based sample 101 using one or more measuring devices, such as one or more cameras, a strain gauge, or a combination thereof, while the load ring 160 and the support ring 150 place the glass-based sample 101 under tensile stress, for example, while the load ring 160 and the support ring 150 flex the glass-based sample 101. As described above, the fixture housing 110 comprises a test opening 116 extending into the second end 112 of the fixture housing 110, the support ring 150 comprises an interior hole 155, and when the support ring 150 is disposed in the fixture housing 110, the interior hole 155 is aligned with test opening 116, providing access to the second surface 104 of the glass-based sample 101. In some embodiments, measuring the surface strength of the glass-based sample 101 comprises directing the measuring device through the test opening 116 of the fixture housing 110 and the interior hole 155 of the support ring 150. For example, the test opening 116 of the fixture housing 110 and the interior hole 155 of the support ring 150 provide a viewing pathway for the one or more cameras and allows a strain gauge to be placed in contact with the glass-based sample 101.

In some embodiments, the method further comprises contacting the glass-based sample 101 with testing media when the glass-based sample 101 is under tensile stress. The testing media may comprise silicon carbide particles, sandpaper, a stylus (or rod), such as a diamond-tipped stylus, or the like. In addition, because the fixture housing 110 comprises the test opening 116 and the support ring 150 comprises the interior hole 155, testing media may be directed through the test opening 116 and the interior hole 155 and into contact with the glass-based sample 101, for example, into contact with the second surface 104 of the glass-based sample 101. The portable flexure fixture 100 allows a user to manipulate and measure the glass-based sample 101 while the glass-based sample 101 is under stress, mimicking stresses that glass-based articles, such as cover glass articles, may undergo in use. In particular, cover glass-based articles and glass-based housings for portable electronics, such as smart phones and tablets, may incur damage while flexed. For example, when a smart phone or tablet is dropped, a tensile stress is applied to the glass-based article upon contact with a surface (such as a ground surface) and particles or other objects may strike the glass-based article while the glass-based article is stressed (e.g., flexed). Thus, the portable flexure fixture 100 provides a portable device for testing the glass-based sample 101 and mimicking these practical scenarios.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology, it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue. Where a value modified by the term "about" is disclosed herein, the exact value is also disclosed. For example, as utilized herein "about 5 mm" also discloses the exact value of "5 mm."

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A portable flexure fixture, comprising:
   a fixture housing,
   a translatable plug,
   a load ring, and
   a support ring,
   wherein:
      the fixture housing comprises a first end opposite a second end, a plug receiving opening extending into the first end and a test opening extending into the second end;
      the support ring is disposed in the fixture housing;
      the translatable plug is insertable into the plug receiving opening of the fixture housing and is translatable in both a sample engaging direction and a sample releasing direction; and
      the load ring is coupled to the translatable plug and is positioned at a sample facing end of the translatable plug such that translation of the translatable plug in the sample engaging direction translates the load ring in the sample engaging direction and translation of the translatable plug in the sample releasing direction translates the load ring in the sample releasing direction.

2. The portable flexure fixture of claim 1, wherein the support ring comprises an interior hole and the support ring is disposed in the fixture housing such that the interior hole is aligned with the test opening.

3. The portable flexure fixture of claim 1, wherein the plug receiving opening is coaxial with the test opening.

4. The portable flexure fixture of claim 1, wherein the load ring is coaxial with the support ring when the translatable plug is positioned in the plug receiving opening.

5. The portable flexure fixture of claim 4, wherein the load ring comprises a sample contacting portion comprising a load ring diameter, the support ring comprises a sample contacting portion comprising a support ring diameter, and the load ring diameter is different than the support ring diameter.

6. The portable flexure fixture of claim 1, wherein:
   the plug receiving opening comprises a plug receiving surface;
   the translatable plug comprises an engagement surface; and
   the plug receiving surface and the engagement surface are threaded such that when the translatable plug is positioned in the plug receiving opening, rotation of the translatable plug translates the translatable plug in the sample engaging direction or in the sample releasing direction.

7. The portable flexure fixture of claim 6, wherein the translatable plug is coupled to the load ring in a rotation independent engagement such that rotation of the translatable plug does not rotate the load ring.

8. The portable flexure fixture of claim 1, further comprising a conical seat disposed in the fixture housing, wherein:
   the fixture housing comprises a conical surface;
   the conical seat is disposed on the conical surface of the fixture housing; and
   the support ring is disposed on the conical seat.

9. The portable flexure fixture of claim 8, wherein:
   the conical seat comprises a ring facing surface and a seat portion recessed into the ring facing surface; and
   the support ring is disposed in the seat portion of the ring facing surface of the conical seat.

10. The portable flexure fixture of claim 9, wherein the plug receiving opening comprises a plug receiving surface extending from the first end of the fixture housing to an interior shoulder and the interior shoulder extends from the plug receiving surface to the conical surface.

11. The portable flexure fixture of claim 1, wherein the fixture housing further comprises an interior shoulder and the support ring is disposed on the interior shoulder.

12. The portable flexure fixture of claim 1, wherein the fixture housing comprises an access hole extending from an outer surface of the fixture housing to an inner surface of the fixture housing.

13. The portable flexure fixture of claim 12, wherein:
   the access hole comprises a window region, a first slot portion extending from the window region in a first direction and a second slot portion extending from the window region in a second direction;
   the first slot portion comprises a first slot height, the second slot portion comprises a second slot height, and the window region comprises a window region height; and
   the window region height is greater than the first slot height and the second slot height.

14. A method of measuring a surface strength of a glass-based sample, the method comprising:
   positioning the glass-based sample in contact with a support ring disposed in a fixture housing of a portable flexure fixture, wherein the fixture housing comprises a first end opposite a second end, a plug receiving opening extending into the first end, and a test opening extending into the second end;
   translating a translatable plug disposed in the plug receiving opening in a sample engaging direction such that a load ring coupled to the translatable plug and positioned at a sample facing end of the translatable plug contacts the glass-based sample and the load ring and the support ring collectively apply a biaxial force to the glass-based sample, placing the glass-based sample under tensile stress; and
   measuring the surface strength of the glass-based sample while the glass-based sample is under tensile stress using a measuring device.

15. The method of claim 14, wherein the support ring comprises an interior hole and is disposed in the fixture housing such that the interior hole is aligned with the test opening.

16. The method of claim 15, further comprising contacting the glass-based sample with testing media when the glass-based sample is under tensile stress, wherein contacting the glass-based sample with the testing media comprises directing the testing media through the test opening and the interior hole of the support ring and into contact with the glass-based sample.

17. The method of claim 15, wherein measuring the surface strength of the glass-based sample while the glass-based sample is under tensile stress comprises directing the measuring device through the test opening and the interior hole of the support ring.

18. The method of claim 15, wherein the load ring is coaxial with the support ring when the load ring and the support ring contact the glass-based sample.

19. The method of claim 15, wherein positioning the glass-based sample in contact with the support ring comprises inserting the glass-based sample into the fixture housing through an access hole, the access hole extending from an outer surface of the fixture housing to an inner surface of the fixture housing.

20. The method of claim 15, wherein:
 the plug receiving opening comprises a plug receiving surface, the translatable plug comprises an engagement surface having plug threads and both the plug receiving surface and the engagement surface are threaded;
 translating the translatable plug in the sample engaging direction comprises rotating the translatable plug; and
 the translatable plug is coupled to the load ring in a rotation independent engagement such that rotation of the translatable plug does not rotate the load ring.

* * * * *

UNITED STATES PATENT AND TRADEMARK OFFICE
CERTIFICATE OF CORRECTION

| | |
|---|---|
| PATENT NO. | : 11,231,351 B2 |
| APPLICATION NO. | : 16/667135 |
| DATED | : January 25, 2022 |
| INVENTOR(S) | : Timothy Edward Meyer et al. |

It is certified that error appears in the above-identified patent and that said Letters Patent is hereby corrected as shown below:

On the Title Page

Item [73], delete "Coming," and insert -- Corning, --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*